US010419408B1

(12) United States Patent
Herzberg et al.

(10) Patent No.: US 10,419,408 B1
(45) Date of Patent: Sep. 17, 2019

(54) IN-PLACE AUTHENTICATION SCHEME FOR SECURING INTRA-VEHICLE COMMUNICATION

(71) Applicant: Karamba Security, Hod Hasharon (IL)

(72) Inventors: Amir Herzberg, Hod Hasharon (IL); Assaf Harel, Ramat Hasharon (IL); Eli Mordechai, Modiin (IL); Tal Efraim Ben David, Hogla (IL); Amiram Dotan, Birmingham, MI (US); David Barzilai, Hod Hasharon (IL); Itay Khazon, Hod Hasharon (IL)

(73) Assignee: KARAMBA SECURITY, Rod Hasharon (IL)

( * ) Notice: Subject to any disclaimer, the term of this patent is extended or adjusted under 35 U.S.C. 154(b) by 17 days.

(21) Appl. No.: 16/140,144

(22) Filed: Sep. 24, 2018

(51) Int. Cl.
*H04L 29/06* (2006.01)
*G06F 21/53* (2013.01)
*G09C 1/00* (2006.01)
*H04L 9/06* (2006.01)
*H04L 12/40* (2006.01)
*H04L 29/08* (2006.01)

(52) U.S. Cl.
CPC .......... *H04L 63/0428* (2013.01); *G06F 21/53* (2013.01); *G09C 1/00* (2013.01); *H04L 9/0643* (2013.01); *H04L 12/40* (2013.01); *H04L 63/12* (2013.01); *H04L 67/12* (2013.01); *H04L 2012/40215* (2013.01)

(58) Field of Classification Search
CPC ... H04L 63/0428; H04L 9/0643; H04L 63/12; H04L 12/40; H04L 2012/40215; H04L 67/12; G06F 21/53; G09C 1/00
See application file for complete search history.

(56) References Cited

U.S. PATENT DOCUMENTS

| | | | | |
|---|---|---|---|---|
| 7,412,726 B1 * | 8/2008 | Viswanath | .......... | H04L 63/0272 713/166 |
| 7,526,085 B1 * | 4/2009 | Bong | .................... | H04L 63/061 380/37 |
| 7,624,263 B1 * | 11/2009 | Viswanath | .......... | H04L 63/0485 713/151 |
| 8,848,608 B1 * | 9/2014 | Addepalli | ............. | H04W 4/046 370/328 |

(Continued)

OTHER PUBLICATIONS

A. Groll and C. Ruland, "Secure and Authentic Communication on Existing In-Vehicle Networks," 2009 IEEE Intelligent Vehicles Symposium, Xi'an, 2009, pp. 1093-1097. (Year: 2009).*

*Primary Examiner* — Darren B Schwartz
(74) *Attorney, Agent, or Firm* — Finnegan, Henderson, Farabow, Garrett & Dunner, LLP

(57) ABSTRACT

In some implementations, a scheme for data communication in an automobile includes generating a cleartext message to be transmitted to a second ECU, generating a pseudo-random counter by applying a pseudorandom function to a counter value that is incremented for each cleartext message generated by the ECU; combining the cleartext message and the pseudo-random counter to create a randomized message; selecting from a plurality of available cryptography techniques, a selected cryptography technique; applying to the randomized message, the selected cryptography technique to create a ciphertext; and transmitting to the second ECU over the CAN bus, the ciphertext.

20 Claims, 7 Drawing Sheets

(56) References Cited

U.S. PATENT DOCUMENTS

| | | | | |
|---|---|---|---|---|
| 8,903,742 | B2* | 12/2014 | Zager | G06Q 20/04 705/57 |
| 2001/0046292 | A1* | 11/2001 | Gligor | H04L 9/0662 380/37 |
| 2002/0181703 | A1* | 12/2002 | Logan | G06Q 20/382 380/30 |
| 2005/0041813 | A1* | 2/2005 | Forest | B60R 25/24 380/262 |
| 2005/0198531 | A1* | 9/2005 | Kaniz | H04L 63/0485 726/5 |
| 2005/0256975 | A1* | 11/2005 | Kaniz | H04L 49/90 709/250 |
| 2007/0214502 | A1* | 9/2007 | McAlister | H04L 63/0428 726/15 |
| 2013/0239169 | A1* | 9/2013 | Nakhjiri | H04L 63/20 726/1 |
| 2014/0032800 | A1* | 1/2014 | Peirce | H04L 67/12 710/105 |
| 2018/0091453 | A1* | 3/2018 | Jakobsson | H04L 51/12 |
| 2018/0316721 | A1* | 11/2018 | Nakano | H04L 63/1466 |

\* cited by examiner

IN-PLACE AUTHENTICATION SCHEME FOR SECURING INTRA-VEHICLE COMMUNICATION

TECHNICAL FIELD

This specification generally relates to Internet of Things (IoT) network security, such as automotive network security (e.g., network security on a CAN bus in an vehicle).

BACKGROUND

Cyber-attacks come in many forms and flavors, but they generally share the same basic concepts: find a preexisting security bug (vulnerability) in a system or a network, exploit it, and perform malicious actions (e.g., running malware, eavesdropping on communications, spoofing the identity of others). For example, network packets that are broadcast to network participants without any sort of cryptography (or other mechanism to hide/obfuscate the message contents) are susceptible to eavesdropping by other entities on the network. In another example, network communication that uses a common transmission medium (e.g., a bus) to broadcast messages among network participants can be susceptible to network participants spoofing the identity of others on the network (e.g., transmitting messages with the sender field having been modified so that the messages appear to originate from another device on the network). Verifying that the sender of a message is authentic, particularly when the message is broadcast over a network (e.g., a bus) such that the true identity of the sender is not readily decipherable from the message's transmission path, is a challenge and a security vulnerability for controllers.

SUMMARY

This document generally describes a technological solution that provide improved network security for communication among externally connected controllers (e.g., ECUs) within an IoT device (e.g., connected automobile), which can protect against any of a variety of malware attacks and/or other cyber security threats. Improved network security can be provided through any of a variety of mechanisms, such as through improved cryptographic engines and processes that more effectively and efficiently obfuscate network traffic from unintended recipients, and that provide for more accurate and reliable techniques for validating communication as having emanated from a particular sender. For example, improved cryptographic engines and processes can provide in-place cryptography and authentication of network communication that does not add any network overhead (e.g., "zero overhead"—meaning no bits of extra data added to network messages to authenticate encoded messages). Furthermore, improved cryptographic engines and processes can have a low performance impact on controllers encoding and authenticating messages on a network—providing robust, resilient, and efficient network security that has a minimal impact on controller and network performance. Additional and/or alternative features can also be used to provide improved cryptographic engines and processes for secure communication among nodes on a network, such as ECUs communicating with each other over a CAN bus or similar networks. While improved cryptographic engines are described throughout this document with regard to ECUs connected to each other over a CAN bus, they are provided as illustrative examples of technical environments in which the improved cryptographic engines can be implemented. The improved cryptographic engines, for example, can be implemented on any of a variety of different networks and nodes (e.g., controllers, communicatively connected devices, and/or other network components).

In one implementation, a system can be used to authenticate communication over a network using in-place cryptography and authentication. The system includes a network. The system includes a first controller configured to transmit messages of a particular type over the network using in-place cryptography and authentication that replaces cleartext in the messages with the ciphertext that does not include any additional bits of information. The system includes a second controller configured to listen for the messages of the particular type transmitted over the network and to authenticate the messages as having originated from the first controller based on the ciphertext, the second controller being loaded with a predetermined model for the particular type of message that identifies one or more redundancies in the messages, the authentication including transforming the ciphertext into the cleartext and verifying the first controller as the source of the messages by identifying the one or more redundancies in the cleartext. This technology can also be used for methods, computer-readable media, devices, and other systems with the same or similar elements.

Implementations can include, none, one, some, or all of the following elements. The predetermined model is generated in a secure environment using analysis of the first controller and the cleartext in the messages of the particular type that are transmitted by the first controller over the network. The analysis includes one or more of static analysis, dynamic analysis, and machine learning. The predetermined model identifies particular bits in the cleartext for messages of the particular type that provide the one or more redundancies and corresponding predictable values for the particular bits. The predetermined model further identifies the particular bits based on previous messages in a sequence of messages of the particular type that have been received from the first controller. The predetermined model further identifies the particular bits based on the presence of one or more patterns of values of bits in the cleartext. The second controller generates the cleartext from the ciphertext, in part, by performing a logical operation on the ciphertext using a value derived from a counter for the messages of the particular type from the first controller, the counter value being incremented for each message of the particular type that is transmitted over the network. The second controller is configured to regenerate the cleartext from the ciphertext using one or more modifications in response to the one or more redundancies not being identified within the cleartext. The second controller generates the cleartext from the ciphertext, in part, by performing a logical operation on the ciphertext using a value derived from a counter for the messages of the particular type from the first controller, and wherein the cleartext is regenerated by modifying the value of the counter. The logical operation includes an XOR operation. The value is derived from the counter by taking a hash of the counter or applying one or more pseudo-random functions (PRF) to the counter. Wherein the counter is incremented for each instance of the cleartext being regenerated, and wherein the cleartext is regenerated a threshold number of times, and after unsuccessfully attempting authenticate the message a threshold number of times, the second controller discards the message. The second controller additionally generates an alarm in response to unsuccessfully attempting to authenticate the message a threshold number of times. The second controller generates the alarm in response to at least a threshold number of messages from the first controller over a period of time being unsuccessfully authenticated. The in-place cryptography performed by the first controller on the cleartext to generate the ciphertext comprises: accessing a counter for the particular type of messages transmitted to the second controller, generating a reproducible value from the counter, performing a logical operation on the reproducible value and the cleartext to generate a combined value, and applying one or more block ciphers to the combined value to generate the ciphertext; and wherein the second controller generates the cleartext from the ciphertext by performing operations comprising: applying the one or more block ciphers to the ciphertext to generate the combined value, accessing a local copy of the counter maintained on the second controller for the particular type of messages transmitted with the first controller, generating a local reproducible value from the local copy of the counter, and performing the logical operation on the local reproducible value and the combined value to generate the cleartext. Only the ciphertext is transmitted from the first controller to the second controller, which is preprogrammed to use the one or more block ciphers, to maintain the local copy of the counter, to perform one or more operations to generate the local reproducible value, and to perform the logical operation. The first controller comprises a first electronic control unit (ECU), the second controller comprises a second ECU, and the network comprises a CAN bus. The first ECU, the second ECU, and the CAN bus are part of an automobile.

Certain implementations can provide one or more of the following advantages. Network security for communicating over a network can be improved. For example, the effectiveness and efficiency with which network communication can be encoded and decoded can be increased, which can permit for robust cryptography schemes to be implemented on devices in ways that have minimal impacts on device performance. For instance, in-place cryptography and authentication can be accomplished with zero network overhead—meaning no additional network traffic should be added to network transmissions to permit message authentication. Additionally, low performance impacts on controllers can be achieved to authenticate network traffic, while at the same time using strong cryptography techniques to thwart potential security threats, like spoofing, eavesdropping, and other possible network security attacks. For example, data communication within a network can be hardened by using efficient cryptography schemes that allow for secure data transmission and validation. Controller processing power can be preserved by selecting ciphers that will maximize cryptography strength while minimizing performance impacts on the processor, such as selecting ciphers based on the size of data, which can provide an advantageous trade off of security hardness and processing efficiency (e.g., processing cycles used to generate cipher). In a further example, automobile security can be improved, including security on the IOT network, for example CAN bus among ECUs within an automobile. In another example, in-place cryptography and authentication can have minimal impacts on network bandwidth, which is in contrast to conventional authentication codes that add extra bits to network packets and consume more network bandwidth.

Additional and/or alternative advantages are also possible, as described below.

BRIEF DESCRIPTION OF THE ATTACHMENTS

Like reference numbers and designations in the various drawings indicate like elements.

DETAILED DESCRIPTION

Figure 1:
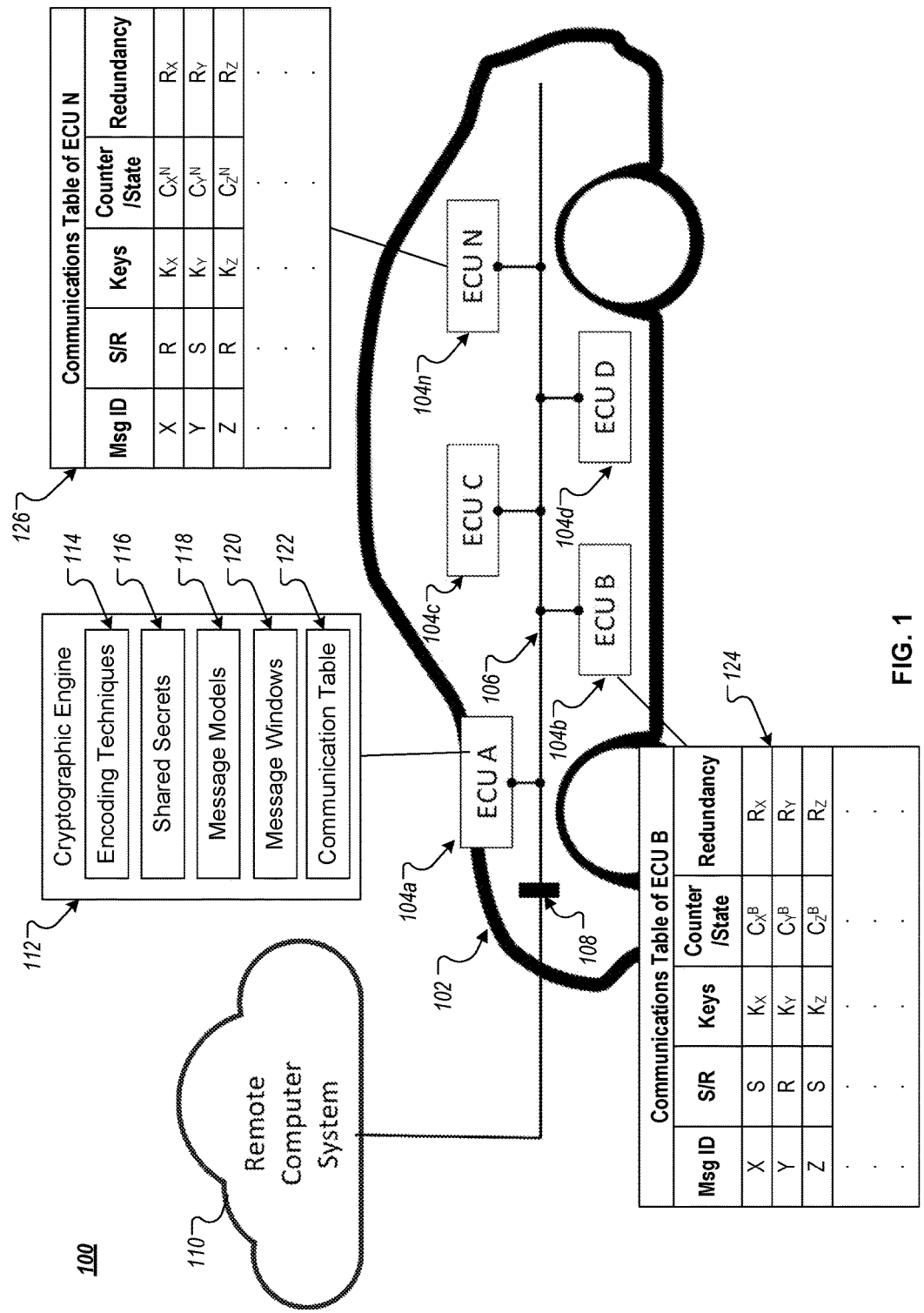
FIG. 1 is a conceptual diagram of an example system for providing low overhead network security on example ECUs that are part of an example vehicle.

FIG. 1 is a conceptual diagram of an example system 100 for providing low overhead network security on example ECUs 104a-n that are part of an example vehicle 102. The example system 100, the vehicle 102, and the ECUs 104a-n are illustrative examples of a specific IoT context within which improved cryptographic engines and techniques can be provided. The system 100 can be implemented on a variety of other IoT devices and systems, including being implemented on other types of controllers (different from the ECUs 104a-n), other types of networks (different from the CAN bus 106), and in other types of IoT devices/systems (different from the system 100 and vehicle 102). For example, the system 100 can be implemented on home automation controllers that are connected to each other within a smart home environment. The system 100 can be applied to other IoT contexts and environments, as well.

In this example, the ECUs 104a-n are depicted as being communicatively connected to each other via a CAN bus 106, which is a communication network within the vehicle 102. The CAN bus 106 is one example type of network over which improved cryptographic engines and techniques can be implemented—application to other types of networks are also possible. Messages between the ECUs 104a-n are broadcast over the CAN bus 102 using message identifiers, with each ECU 104a-n being configured to transmit and/or listen for messages that are transmitted over the CAN bus 106 with a particular message identifier. If the messages are unencoded, all of the ECUs 104a-n are able to read the contents of the messages. Furthermore, the only information that is used to identify the type of a message is included in the message headers, which can be spoofed. Thus, without cryptographic engine security, the messages over the CAN bus 102 are susceptible to eavesdropping and spoofing.

Each of the ECUs 104a-n can be loaded with a custom cryptographic engine 112 (only depicted for ECU A 104a, but also present in the other ECUs 104b-n) that can be used to implement low overhead network security for the ECUs 104a-n and the CAN bus 106. In particular, the cryptographic engine 112 includes cryptography techniques 114 that are programmed to efficiently convert cleartext messages that would otherwise be visible to all other ECUs on the CAN bus 106 into cipher text in a way that can permit efficient decoding and authentication of message. The cryptography techniques 114 can also provide in-place cryptography that does not add any overhead to message traffic that is transmitted over the CAN bus 106—meaning that no additional data is added to network traffic as part of the cryptography and authentication scheme. This permits the cryptographic engine 112 to have no performance impact on the CAN bus 106, including avoiding unnecessarily consuming extra bandwidth on the CAN bus 106. For example, conventional techniques for authenticating communication over a CAN bus have added authentication codes to messages, which consume extra network bandwidth. In contrast, cryptographically protected messages can be sent over the CAN bus 106 and authenticated without such additional codes or bits being added to the messages, which can permit for message authentication to be accomplished without affecting the bandwidth of the CAN bus 106. Additionally, by not adding any extra bits or fields/codes to the messages, transmission over the CAN bus 106 can ensure continued backward compatibility with other systems and devices using the messaging protocol, including legacy lower-layer mechanisms. For example, lower-layer legacy mechanisms that provide portions of the CAN bus 106 (e.g., components configured to send, receive, and retransmit message) can be configured to operate with messages of a certain length. By avoiding changing the message length, while at the same point still providing message authentication and cryptographic protections, backward compatibility with these components can be maintained, which permits this technology to be more readily and easily deployed across a broader range of networks (e.g., able to deploy without upgrading/modifying underlying system). In another example, network latency can be unaffected. For the vehicle 102 and the CAN bus 106 to be able to meet various operating specifications (e.g., industry specification, manufacturer specifications, regulatory requirements) for safe operation, the latency for network traffic may be required to be below a certain threshold. By providing in-place cryptography and authentication that does not add to the traffic on the CAN bus 106, the cryptographic engine 112 can enhance the security of the vehicle 102 and its ECUs 104*a-n* without any impact on the performance of the CAN bus 106.

The cryptographic engine 112 can include shared secrets 116 that can be used by the cryptography techniques 114 to encode, decode, and authenticate message traffic over the CAN bus 106. For example, each of the ECUs 104*a-n* can be programmed to establish symmetric cryptography keys for each of the ECU pairs and/or for each of the message identifiers. The symmetric keys and/or information that can be used to recreate the symmetric keys (e.g., public key of other controller) can be stored locally by the cryptographic engine 112. For example, symmetric cryptography keys can be used to encode communication between senders and recipients so that only the sender and recipient, which are the only two ECUs with access to the symmetric cryptography key, are able to decode and read the information being transmitted. Additionally, these symmetric cryptography keys also permit for the sender and recipients to validate the identity of the purported sender of a message as identified via the message header. For example, ECU A 104*a* and ECU B 104*b* establish a symmetric key for that ECU-pair (ECU A and ECU B) that is then only known to those ECUs. The other ECUs are not privy to this key, so they are not able to decode messages between ECU A and B, or to spoof the identity of either of those ECUs to infiltrate communication between that ECU-pair.

The symmetric keys can be established between the ECUs 104*a-n* in any of a variety of ways, such as through public key cryptography, like Diffie-Helman or other techniques for two parties to create a shared secret through publicly distributed information, and/or through loading the symmetric keys onto the ECUs 104*a-n* (e.g., OEM generating secret keys that are loaded onto the ECUs 104*a-n*).

The cryptographic engine 112 includes components that are used, in combination with and as part of message cryptography, to authenticate encoded message traffic as being from an authentic/legitimate sender. For example, the authentication scheme can use cryptographic modules, such as block ciphers. Block ciphers can be used for authentication. Specifically, the authentication scheme can apply a block cipher as part of the process of encoding and authenticating a cleartext (also referred to as "plaintext") message, resulting in a ciphertext message that is subsequently transmitted over the CAN bus 106. The authentication scheme can also apply a dual process of decoding and validating a ciphertext message by the recipient of the message to transform it back into a validated cleartext message or into an error indicator if the validation fails. In each process—the encoding/authenticating and the decoding/validating—a block cipher can be applied multiple times (e.g., block cipher applied twice, block cipher applied three times, etc.). For example, in an instance where the block cipher is applied twice, a first application of a block cipher can be used create a pseudo-random variant of the current message counter (which can be XORed to the plaintext before entry to the block cipher) and the second application of a block cipher can be applied to output of the first application.

As part of the authentication scheme, messages are transmitted with zero network overhead—meaning that messages do not include any additional information that may otherwise be used by the recipient to authenticate or verify that the message payload has been decoded correctly or that it is from an authentic/valid sender (i.e., not from a corrupted ECU that is spoofing another ECU and injecting malicious traffic onto the CAN bus 106). To do this, the cryptographic engine 112 includes message models 118 that can model the messaging behavior between ECUs 104*a-n* on the CAN bus 106. The message models 118 can be a table mapping from each message type to a specific message model that identifies the redundancy in each message type, which is used to authenticate and validate the message types. Redundancy refers to the fact that a specific type of message can only be a subset of all possible strings (of same length). For example, a word in the English language has lots of redundancy compared to the set of all possible strings of same length—i.e., most strings of particular length are not valid words in English. A particular type of redundancy for a message type is when specific bits in the message have known values. Message models for each type of message can include a variety of details that can be used to authenticate messages of that type transmitted over the CAN bus 106 without additional data being added to messages, such as permissible ranges for message values (e.g., message values range from first integer to second integer value), message types (e.g., string, integer, float, enumerated data type, Boolean value), message size (e.g., 1 byte, 2 bytes, 4 bytes, 8 bytes), message value sequences (e.g., progression of message values), message frequency (e.g., frequency with which particular messages are transmitted over CAN bus 106), contingent message relationships (e.g., relationship in values across different message identifiers), and/or other features for modeling the authenticity of message values. There can be different message models 118 for each of the message identifiers that are transmitted over the CAN bus 106, and in some instances there can be separate models for each ECU 104*a-n* for each message identifier that the ECU 104*a-n* may listen for or transmit over the CAN bus 106. The message models 118 that are loaded onto each ECU 104*a-n* can be limited to only those models (or portions thereof) that are relevant to those ECUs 104*a-n* so as to minimize the resources that are used/dedicated on the ECUs 104*a-n* to message authentication.

The message models 118 can be determined and generated in advance of being installed on the ECUs 104a-n in actual use. For instance, the message models 118 can be determined in a safe and secure environment, such as in a testing environment that puts the vehicle 102 through its full range of operation and conditions. Message models 118 can be determined using any of a variety of appropriate modeling techniques, such as using static analysis, dynamic analysis, machine learning algorithms (e.g., neural networks, regression analysis, clustering techniques), and/or other techniques for generating the message models 118.

In some instances, the cryptographic engine 112 can optionally include a state information 120 that can be used and analyzed with the message models 118 to determine whether messages that are being received are authentic. For example, the cryptographic engine 112 can use the state information 120 as part of the authentication scheme, such as counters which can provide a state of messages transmitted for a particular message type and/or windows of recent messages. For example, each ECU 104a-n can include a communication table 122-126 with a listing of each message ID on the CAN bus 106 that the specific ECU is sending or receiving messages ("S/R"—"S" represents sending and "R" represents receiving), keys that are used for each message ID, counters and/or other state information for each message ID, and redundancy information for each message ID (e.g., message models 118 for each message ID). The cryptographic engine 112 may optionally use other state information for message transmissions, which can be derived from a state information 120 stored, at least temporarily during runtime, and can be used to determine whether current messages are being received over the CAN bus 106 are authentic using a validation function, such as described below with regard to FIGS. 2, 5, and 6.

The vehicle 102 can be communicatively connected to one or more remote computer systems 110 (e.g., management computer system), which can communicate remotely with the ECUs 104a-n via one or more gateways 108 for a variety of purposes. For example, the remote computer system 110 can monitor the status of the ECUs 104a-n and, when a security threat is detected by one or more of the ECUs 104a-n (e.g., inauthentic message detected that indicates potential security threat), can aggregate ECU status information and vehicle security information for presentation in one or more dashboards (e.g., manufacturer dashboard, OEM dashboard). The ECUs 104a-n can generate alerts when potential security threats are detected, along with threat traces (e.g., message, associated message information, vehicle information at time of threat) that are transmitted to the remote computer system 110, which can analyze the alerts, retransmit the alerts (e.g., alert manufacturer, alert driver via third party communication channel), and/or initiate threat mitigation operations.

Figure 2:
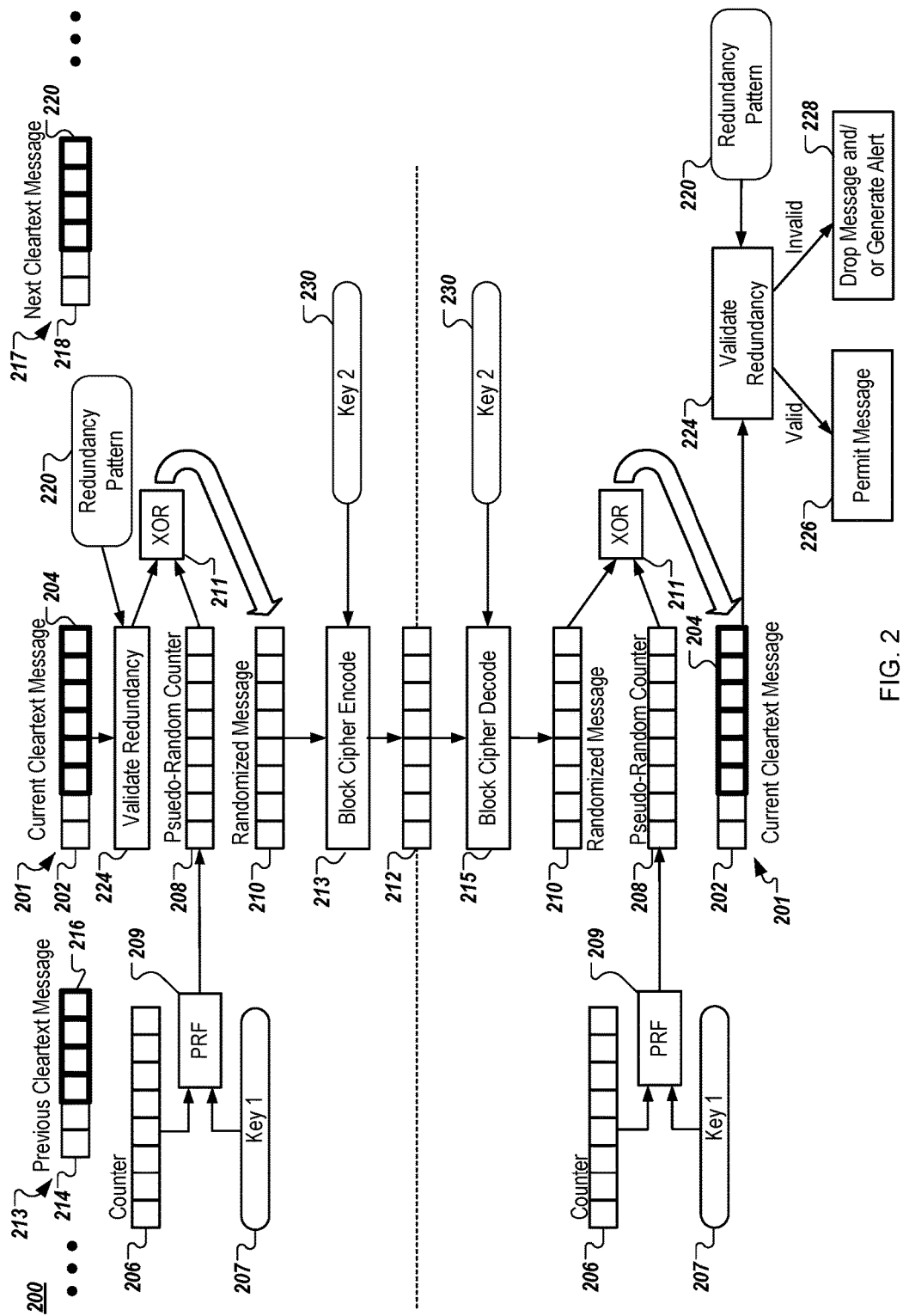
FIG. 2 is a block diagram of example data that is encoded and decoded for communication over a CAN bus.

FIG. 2 is a block diagram of example data 200 that is encoded and decoded for communication over a CAN bus. The data 200 shows information that may be used, for example, in communication between two ECUs 104. The ECUs 104 may be configured to transmit cleartext messages 201 to each other, and the encoding and decoding applied as shown here may be used to protect the communication (i.e., obfuscate the cleartext) from third party spoofing, or from other security concerns. The example depicted in FIG. 2A (and FIG. 2B) can be implemented in any of a variety of IoT contexts, such as in the system 100 described above with regard to FIG. 1 and/or other IoT contexts (e.g., smart homes, security systems, automation systems, drone systems).

A cleartext message 201 can include messages made up of, for example, one to eight bytes of data, each byte having eight bits of data. In this example, the cleartext message is made of one byte of data, but other message lengths are also possible. In other examples, a different number of bytes of data may be used, such as two to eight bytes of data, one to twelve bytes of data, etc.

The cleartext message 201 may include or consist of sensor readings, remote procedure calls, instructions to actuate a controllable device, or other types of data that two IOT devices, for example controllers transmit to each other. For example, a cleartext message 201 can include an engine temperature reading that is gathered by one ECU and transmitted to another ECU or broadcast to all ECUs in a single automobile. In another example, a cleartext message 201 can include CAN commands, such as instructions to increase rotation, apply brakes, and/or change gears in the car that contains the ECUs. In a further example, a cleartext message 201 can include instructions being transmitted among home automation controllers within a smart home environment, like instructions for a controller (e.g., garage door controller, smart lock controller) to unlock or open a door. Furthermore, although FIG. 2A is described with regard to ECUs, it can be applied to other types of controllers and other network environments.

The cleartext message 201 can include non-redundant data 202 and redundant data 204. As explained above, redundant data 204 refers to the patterns of data for each specific type of message, which include only be a subset of all possible strings (of same length). A particular type of redundancy for a message type is when specific bits in the message have patterns that lend themselves to being known values. The redundant data 204, which are the predictable or expected portions of the cleartext message 201, can be some or all of the cleartext message 201. The non-redundant data 202 can be other portions of the message 201 that do include predictable or expected values based on the message identifier (or type) for the message 201. For example, the redundant data 204 may be portions of the message 201 (based on its message type) with values that do not fluctuate or change, or that fluctuate or change in predictable or expected ways. In contrast, the non-redundant data 202 may be portions of the message 201 (based on its message type) with values that are not predictable or expected. For instance, in the depicted example in FIG. 2, the non-redundant data 202 is two bits that, for the message type of the message 201, do not have a well confined subset of values, such as values representing frequently changing and highly variable states in a vehicle, like speed, revolutions per minute (RPM) of an engine, and/or other values. In contrast, the redundant data 204 in the depicted example is six bits that, for the message type of the message 201, have a well confined subset of values that are predictable or expected, such as values representing predictable or invariable states in the vehicle. In some instances, the redundant data 204 can be filler data that is not part of the message payload or content for the cleartext message 201. Although depicted as having a split of two bits for the non-redundant data 202 and six bits for the redundant data 204, other combinations of the bits, bytes, or other portions of the cleartext message 201 that are redundant data 204 and the non-redundant data 202 are also possible, and can depend on the message type for the cleartext message 201. For example, with some message types, all of the bits of the cleartext message 201 can be redundant data 204. Additionally, with some message types, the redundant data 204 can be non-contiguous bits within the cleartext message 201. As explained above, the cleartext message 201 can have any of a number of standard lengths (e.g., 1 byte, 2 bytes, 4 bytes, 8 bytes), and the redundant data 204 (bits, bytes) of the message 201 can be determined based on the type for the message (e.g., the message identifier for the message 201).

The message redundant data 204 can include values that, based on the message id for the message 201, are predictable/expected, which can be used by the recipient to authenticate the message 201 without requiring the addition of any authentication bits (e.g., CRC code, hash values) to or other modifications of message 201. The predictability of the redundant data 204 can be based on the message id alone, and/or it can be additionally based on a sequence of messages for the message id. For example, the current message 201 is part of a series of messages that are transmitted over the network for the message id, which in this example includes a previous message 213 (with non-redundant data 214 and redundant data 216) and a next message 217 (with non-redundant data 218 and redundant data 220). The value of the redundant data 204 for the current message 201 can be predicted by the recipient based on, for example, the identifier for the message 201 alone and/or a based on a combination of the message identifier and of values contained in the previous message 213 (or other previous messages in the sequence of messages). The predicted or expected value for the redundant data 204 in the current message 201 can be evaluated against the actual value of the redundant data 204 to validate the redundancy in the message (224), which can be performed by the sender of the message 201 (to ensure that the message 201 includes redundant data 204 that can be validated by the recipient) before sending the message 201 and can be performed by the recipient of the message 201 to authenticate the message 201. For example, redundancy patterns 220, which can be part of a model for the message id, can be pregenerated through dynamic and static analysis of the ECU and network behavior, and can define expected values (e.g., static values, dynamically changing values, permissible ranges of values) in the redundant data 204 for message of a corresponding type. Such a redundancy patterns 220 can be loaded onto the ECU and used to identify an expected value and/or a range of expected values for the redundant data 204. In-place authentication is designed assuming messages (e.g., message 201) has significant amount of redundancy, as represented by the redundant data 204. The redundancy may be different for different message types; for example, one message type may have a simple fixed pattern to all messages, e.g., all begin with a specific prefix (e.g., the first few bits are all zeros). Another message type may have more dynamic redundancy, e.g., message contain a value of some counter or physical value, and hence, only minor changes are possible in this value from one message to the next. The redundancy for a specific message type can be represented by its model, which includes redundancy patterns 220. In a system deploying the scheme, the controller can maintain a table identifying the model of each message type. This table would be generated as part of the system design, e.g., by vehicle manufacturer. The generation may involve manual and/or automated processes, e.g., using machine learning.

As depicted in FIG. 2, both the sender and recipient (as well as other controllers transmitting and/or listening to the type of the message 201) can maintain a counter 206 for the type of message 201. The counter 206 can simply be incremented (or otherwise changed in predetermined ways) as messages of the type for the message 201 are transmitted over the network (e.g., CAN bus).

The counter 206 can be transformed into a pseudo-random counter 208 through the use of a first key 207 that is combined with the counter using a pseudorandom function (PRF) 209. The first key 207 can be a shared secret between the sender and recipient controllers, such as a symmetric key value (or other type of key) that is securely stored/reproducible by both the sender and recipient. Any of a variety of PRFs can be used as the PRF 209, such as a block cipher, a look-up table, and/or other type of PRF.

Once the redundancy of the cleartext message 201 (which includes the non-redundant data 202 and the redundant data 204) has been validated (224), the cleartext message 201 and the pseudo-random counter 208 can be combined (211) to create a randomized message 210. For example, the cleartext message 201 and the pseudo-random counter 208 can be combined using an XOR operation 211.

The randomized message 210 can be subject to a block cipher encoding process 213, which can use a key 230 to encode the randomized message 210, to create a ciphertext 212. Various block cipher encoding schemes are possible, with some discussed in more detail later. The key 230 can be a shared secret between the sender and recipient controllers, similar to the key 207. Other encoding processes different from block ciphers may additionally and/or alternatively be used. The ciphertext 212 may then, once created, be passed from one ECU to another ECU over a CAN bus or broadcast to all available ECUs on a CAN bus. By passing the ciphertext 212 instead of, for example, the cleartext message 201, the ECUs can communicate in a way that is hardened from eavesdropping, spoofing, etc.

As shown, the receiving ECU can perform the same operations of the sender, but in reverse order to turn to the ciphertext into the cleartext message 201, including performing a block cipher decoding 215 of the ciphertext 212 to generate the randomized message 210, generating the pseudo-random counter 208 and combining it via an XOR operation 211 with the randomized message 210 to obtain the cleartext message 201. The receiving ECU also validates (224) the predictable data 204 before accepting the cleartext message 201 through the use of redundancy patterns 220 for the message type to determine expected values for the redundant data 204. If the expected value matches the actual redundant data 204 in the decoded message 201, then the message 201 can be validated as originating from an authentic source (as opposed to another source spoofing the identity of the sender) and permit the controller to use the message 201 (226). In contrast, if the expected value does not match the actual redundant data 204 in the decoded message, then the message can be dropped by the controller and/or an alert can be generated (228). Such an alert can indicate any of a variety of problems that may exist, such as a third party attempting to spoof the identity of the sender, and/or the sender and the recipient falling out of sync with regard to their shared secrets (key 207, key 230) and/or their shared counter value 206 with regard to the message type.

For the block ciphers described above with regard to FIG. 2, and throughout this document, an existing block cipher can be used when available for particular block lengths. For example, the SPECK 32/64 block cipher can be used for blocks (e.g., messages) that are 4 bytes in length, the SPECK 48/96 block cipher can be used for blocks that are 6 bytes in length, and the SPECK 64/218 block cipher can be used for blocks that are 8 bytes in length. When no block ciphers are available for a particular block length, other encoding techniques, such as Feistel, can be used to create an invertible transform for those block sizes. Additionally and/or alternatively, a simple lookup table can be used to transform blocks.

Figure 3:
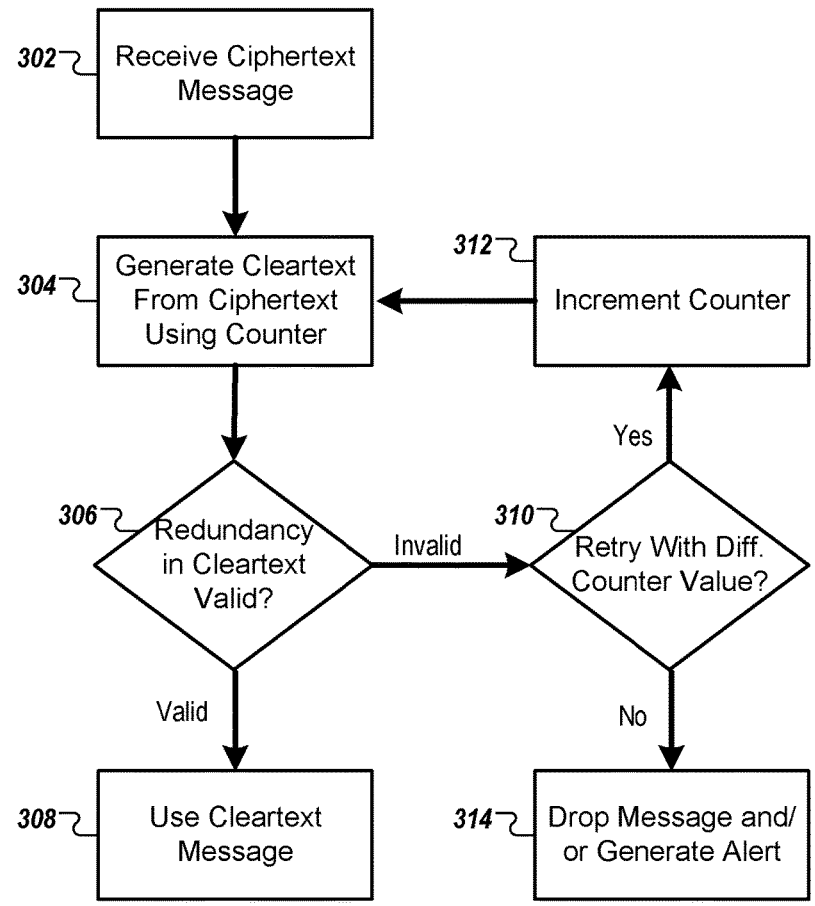
FIG. 3 is a flowchart of an example process for iteratively attempting to decode ciphertext with different counter values.

FIG. 3 is a flowchart of an example process 300 for iteratively attempting to decode ciphertext with different counter values. The example process 300 can be performed by any of a variety of controllers, such as the ECUs described above with regard to FIGS. 1 and 2.

A ciphertext message can be received (302) and can be used to generate a corresponding cleartext message using a counter (304). For example, the ciphertext 212 can be received by the recipient ECU, as depicted in FIG. 2, and used to generate a cleartext message through decoding the ciphertext 212 to obtain a randomized message 210 (215), generating a pseudo-random counter value 208 (209), and combining the pseudo-random counter value 208 and the randomized message 210 (211) to generate the cleartext message 201. The redundancy in the cleartext can be validated (306), similar to the description above with regard to the validation 224. If the cleartext is valid, then the cleartext message can be used by the controller (308), similar to the description above with regard to 226. If the cleartext is invalid, then a determination can be made as to whether to retry generating the cleartext value from the ciphertext using a different counter value (310). For example, the controller may limit the number of times different counter values are tried (e.g., 1 attempt, 2 attempts, 3 attempts, etc.), and so this determination may be a check on whether that threshold number of attempts has been reached. If the threshold number of attempts has not yet been reached for the message, then the counter can be incremented (312) and the cleartext can be generated again using the incremented counter value (304) and the redundancy of the cleartext can again be determined (306). If the threshold number of attempts has been reached without the cleartext message being successfully validated, then the message can be dropped and/or an alert can be generated (314), similar to the description above with regard to 228.

Figure 4:
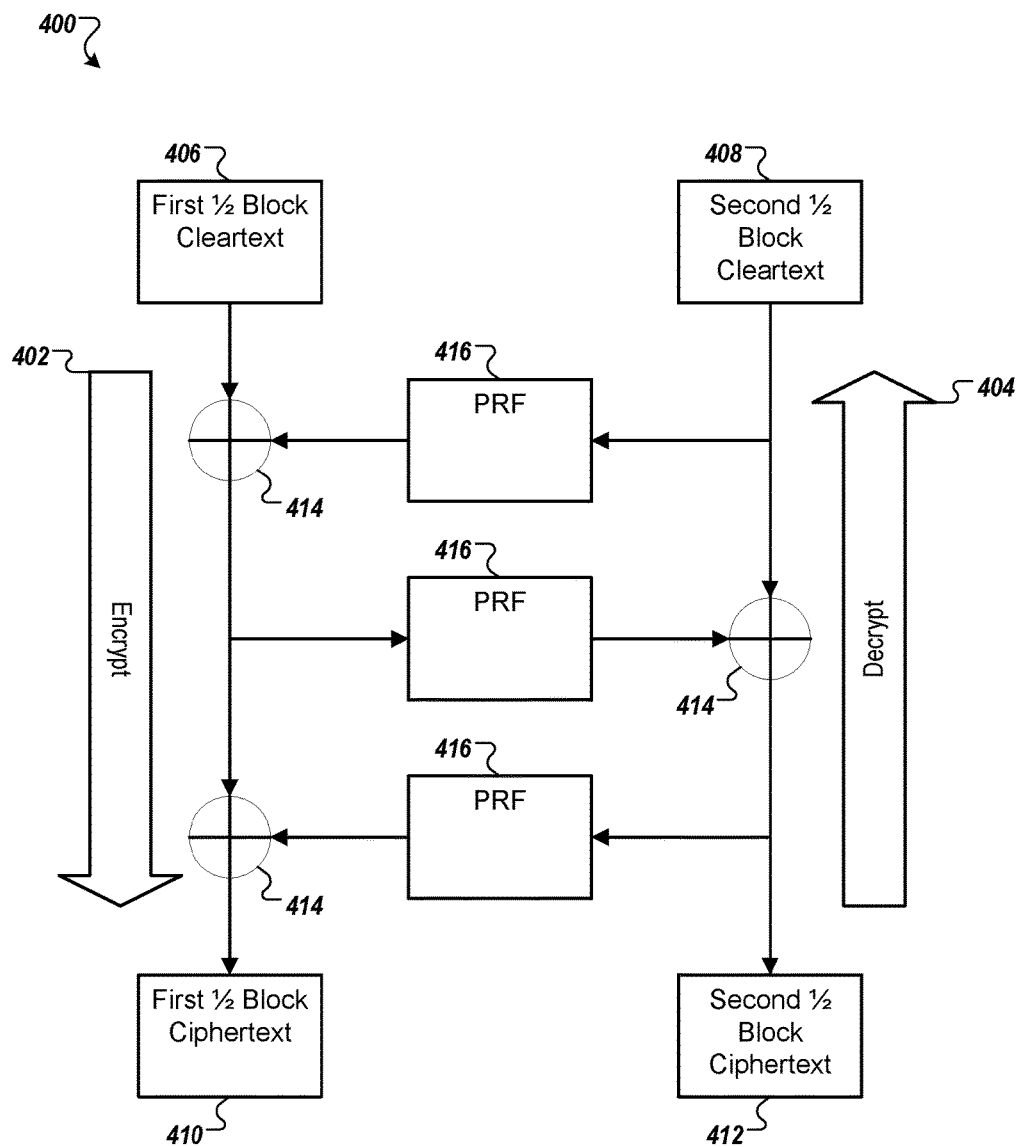
FIG. 4 is a flowchart of an example of a process for encoding and decoding data.

FIG. 4 is a flowchart of an example of a process 400 for encoding and decoding data. As is shown, the process 400 is a process for symmetric encoding and decoding of data, and is an example of a Fiestel cipher, as described above with regard to FIG. 2. For instance, referring to the example in FIG. 2, the process 400 can be used as the cipher process for messages of 2 bytes, 3 bytes, 5 bytes, 6 bytes, and 7 bytes (and/or messages of other lengths). Other applications of the process 400 to messages of other data lengths are also possible. The data, in the form of cleartext, can be processed in the encode 402 direction (down, here) to generate corresponding ciphertext. Similarly, the ciphertext can be processed in the decode 404 direction (up, here) to generate corresponding cleartext. Assuming the same cryptography key is used to both encode 402 and decode 404, a cleartext can be encoded 402 and then decoded 404. This is useful, for example, because this can allow a transmitting ECU to encoded cleartext message (e.g., cleartext message 201 or randomized message 210) for transmission as ciphertext. Then, for reception, a receiving ECU can receive the ciphertext and decode it to form the cleartext message. While the example process 400 depicts three rounds of logical operators to generate the ciphertext, additional rounds of logical operators could also be used. For example, four or more rounds of logical operators can provide additional security.

In the process 400 a cleartext is broken up into a first half block of cleartext 406 and a second half block of cleartext 408. For example, if the cleartext is two bytes (a.k.a., sixteen bits), the first half block 406 is the first eight bits and the second half block 408 is the second eight bits. In another example, if the cleartext is five bytes (a.k.a. forty bits), each half block 406 and 408 is twenty bits.

In the process 400 a ciphertext is broken up into a first half block of ciphertext 410 and a second half block of ciphertext 408. For example, if the cleartext is two bytes (a.k.a., sixteen bits), the first half block 406 is the first eight bits and the second half block 408 is the second eight bits. In another example, if the cleartext is five bytes (a.k.a. forty bits), each half block 406 and 408 is twenty bits.

When using the process 400 for encoding 402, the cleartext is split into the first half block 406 and the second half block 408. The output of the cryptography 402, the first half block of ciphertext 410 and the second half block of the ciphertext 412, can then be merged in order to create the final ciphertext.

When using the process 400 for decoding 404, the ciphertext is split into the first half block 401 and the second half block 412. The output of the decoding 404, the first half block of cleartext 406 and the second half block of the cleartext 408, can then be merged in order to create the final cleartext.

The process 414 includes three XOR operations 414 and three PRF operations 416. The particular PRF operation 416 may be selected from a plurality of possible PRF operations. For example, as shown in FIG. 3, an ECU may select a PRF operation based on the data length of a message to be processed by the process 400. For example, a data length of two or three bytes may result in an ECU selecting a lookup table for the process 400. A data length of five, six, or seven bytes may result in an ECU selecting SPECK 32/64 for the process 400.

Figure 5:
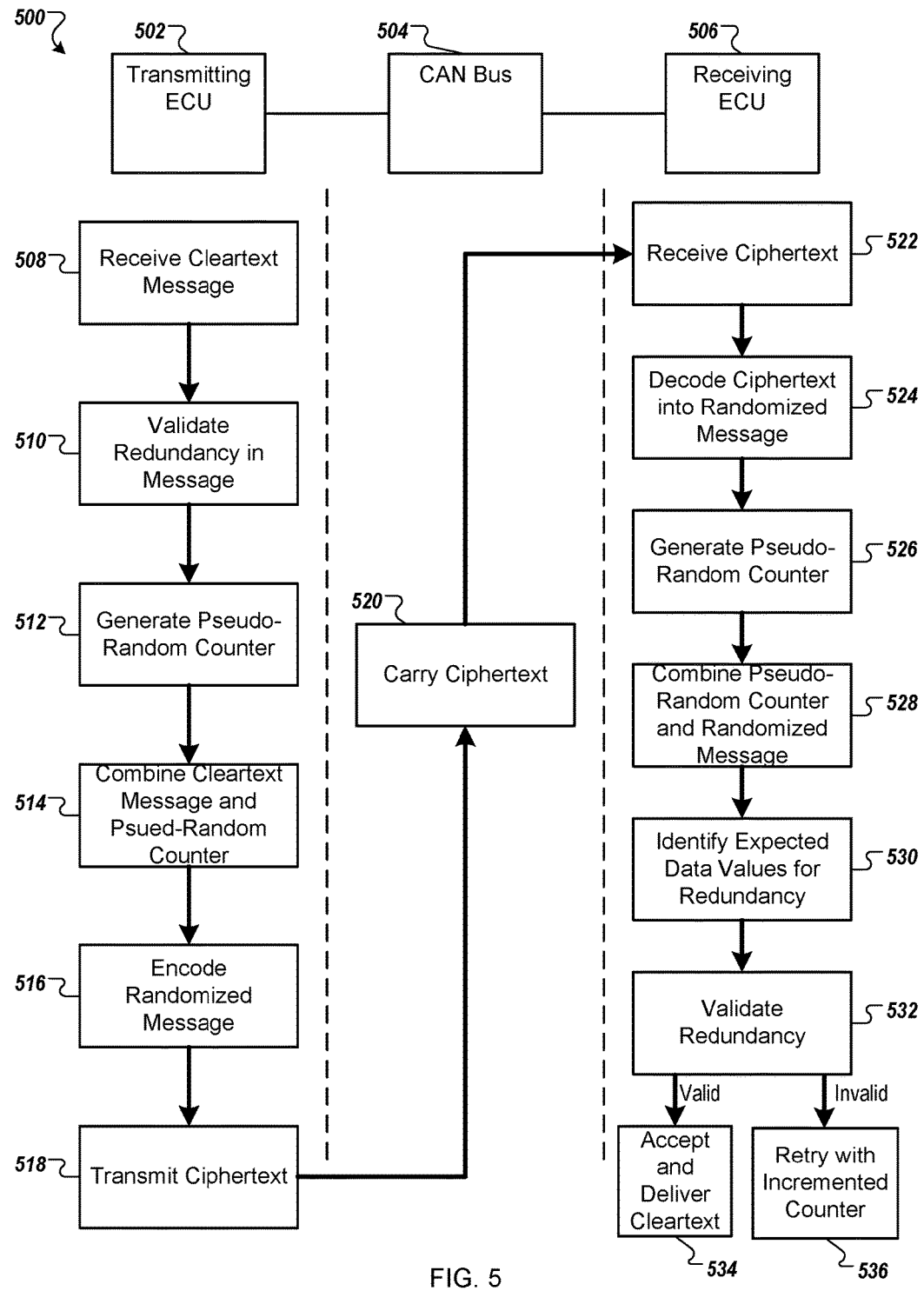
FIG. 5 is a swimlane diagram of an example process used to encode and decode data communicated over a CAN bus.

FIG. 5 is a swimlane diagram of an example process 500 used to encode and decode data communicated over a CAN bus. The process 500 can be performed by, for example, a transmitting ECU 502 that can communicate over a CAN bus 504 with a receiving ECU 506. To harden the communications over the CAN bus 504, the transmitting ECU 502 and the receiving ECU 506 can communicate with encoded data. For example, the two ECUs 502 and 506 can both be configured to use the same cryptography scheme and cryptography keys, allowing them to privately access the cleartext of enciphered data. Some of these operations that are depicted in series in process 500 may additionally and/or alternatively, be performed in parallel with each other.

The transmitting ECU 502 can accept a cleartext message to be transmitted to the receiving ECU 506, the cleartext message having one to a particular number of bytes of information 508. For example, the normal operations of the transmitting ECU 502 can result in the generation of a message that should be sent to the receiving ECU 506, and the transmitting ECU 502 can receive the cleartext message for such a communication. In another example, the transmitting ECU may be an access point for the CAN bus 504 through which a message to the receiving ECU 506 is routed. In such a case, the transmitting ECU 502 can receive the cleartext message in order to prepare to route the information to the receiving ECU 506.

In one example, the transmitting ECU 502 may be responsible for monitoring the operating temperature of an engine in an automobile. When the transmitting ECU 502 detects an abnormally high engine temperature, the transmitting ECU 502 can receive a four-byte cleartext message that should be sent to a receiving ECU 506 responsible for presenting information on the automobile's dashboard. This cleartext message can include instructions for the receiving ECU 506 to illuminate a lamp indicating high engine temperature and to sound an alarm.

As described above with regard to FIG. 2, the cleartext message can include redundant data (e.g., redundant data 204), which can be compared against expected values for these message components (generated using one or more predetermined models for the message) to authenticate the message. As discussed above, these values can be predictable based on any of a variety of factors, such as a known previous message of the same type, and when they are determined to be within an acceptable range or distance of an expected values, can indicate that the message is authentic and not from a nefarious source (e.g., source spoofing identity of another ECU). For example, for a four-byte cleartext message of engine temperature, previous off-line testing of the vehicle may show that 143 bits of the four-byte message are predictable. In another example, testing of a home automation controller may indicate that a two-byte cleartext message identifying the current operating status of a corresponding home automation device (e.g., lock, sensor, camera, latch) includes several predictable bits throughout the message. Such predictable bits may be spread out through the message, they may or may not be contiguous, may be the leftmost or rightmost bits, etc. However, as is shown here, the transmitting ECU 502 may or may not explicitly identify which bits within the cleartext message are predictable. Instead, the receiving ECU 506 can be preloaded with a model for identifying the predictable bits based on, for example, the message type (e.g., engine message type, home automation type message) that identifies the predictable (expected) values for these bits, which can be used to authenticate the message.

The transmitting ECU 502 can validate the redundancy in the message (510) (for its message type) before encoding and transmitting the message over the CAN bus 504. For example, the transmitting ECU 502 can ensure that redundant data is present in the message that will permit the receiving ECU 508 to authenticate the message. The transmitting ECU 502 can access a model for the type of the message and can use the redundancy patterns (e.g., redundancy patterns 220) included therein to validate the redundancy in the message. Once the redundancy in the message has been validated, the transmitting ECU 502 can generate a pseudo-random counter by applying a pseudorandom function to a counter value that is incremented for each cleartext message generated by the ECU (512). For example, the transmitting ECU 502 can keep a counter (e.g., counter 206) that increments every time a new cleartext message of the message type is transmitted over the CAN bus 504. The transmitting ECU 502 can apply a PRF (e.g., PRF 209) to the value of the counter that is associated with the cleartext message in order to generate a pseudo-random counter. Examples of these pseudorandom functions include a block cipher, lookup table, a hash function, etc.

The transmitting ECU 502 can combine the cleartext message and the pseudo-random counter to create a randomized message (514). For example, the transmitting ECU 502 can use, as input, the cleartext and the pseudo-random counter to a function that combines those two values to generate a randomized value, such as combining the cleartext message and the pseudo-random counter values using an XOR function.

The transmitting ECU 502 can encode the randomized message to generate ciphertext (516), which can then be transmitted over the CAN bus 504 (516). For example, the ECU 502 can apply a block cipher to the randomized message using a key that is a shared secret between the transmitting ECU 502 and the receiving ECU 504. The transmitting ECU 502 can then transmit, to the receiving ECU 506 over the CAN bus 506, the ciphertext (518) in a message that include the message identifier in a header field.

The CAN bus 504 can carry (520) the ciphertext from the transmitting ECU 502 to the receiving ECU 506, and the receiving ECU 506 can receive the ciphertext (522). For example, the receiving ECU 506 can listen on the CAN bus 504 for any messages that contain the message identifier and pull in the message from the transmitting ECU 502.

The receiving ECU 506 can decode the ciphertext into the randomized message (524). The receiving ECU 506 can use the same block cipher and key to decode the ciphertext as the transmitting ECU 502 used to encode the message (516). The receiving ECU 506 can then generate the pseudo-random counter (526), similar to the transmitting ECU 502 (512), and can combine the pseudo-random counter with the randomized message to generate a cleartext message (528), such as through an XOR operation. The receiving ECU 506 can then identify expected data values for redundancy in the cleartext message (530), which can be based on the type for the message and corresponding redundancy patterns for that message type. The redundancy can then be validated (532) and, if the redundancy is determined to be valid, the cleartext message can be accepted and delivered (534). In contrast, if the redundancy in the cleartext message is determined to be invalid, then the receiving ECU 506 can retry the authentication operations with an incremented counter (536). The receiving ECU 506 may retry the authentication operations up to a threshold number of times (e.g., retry 1 time, retry up to 2 times, retry up to 3 times, etc.) before dropping the message and generating an alert.

Figure 6:
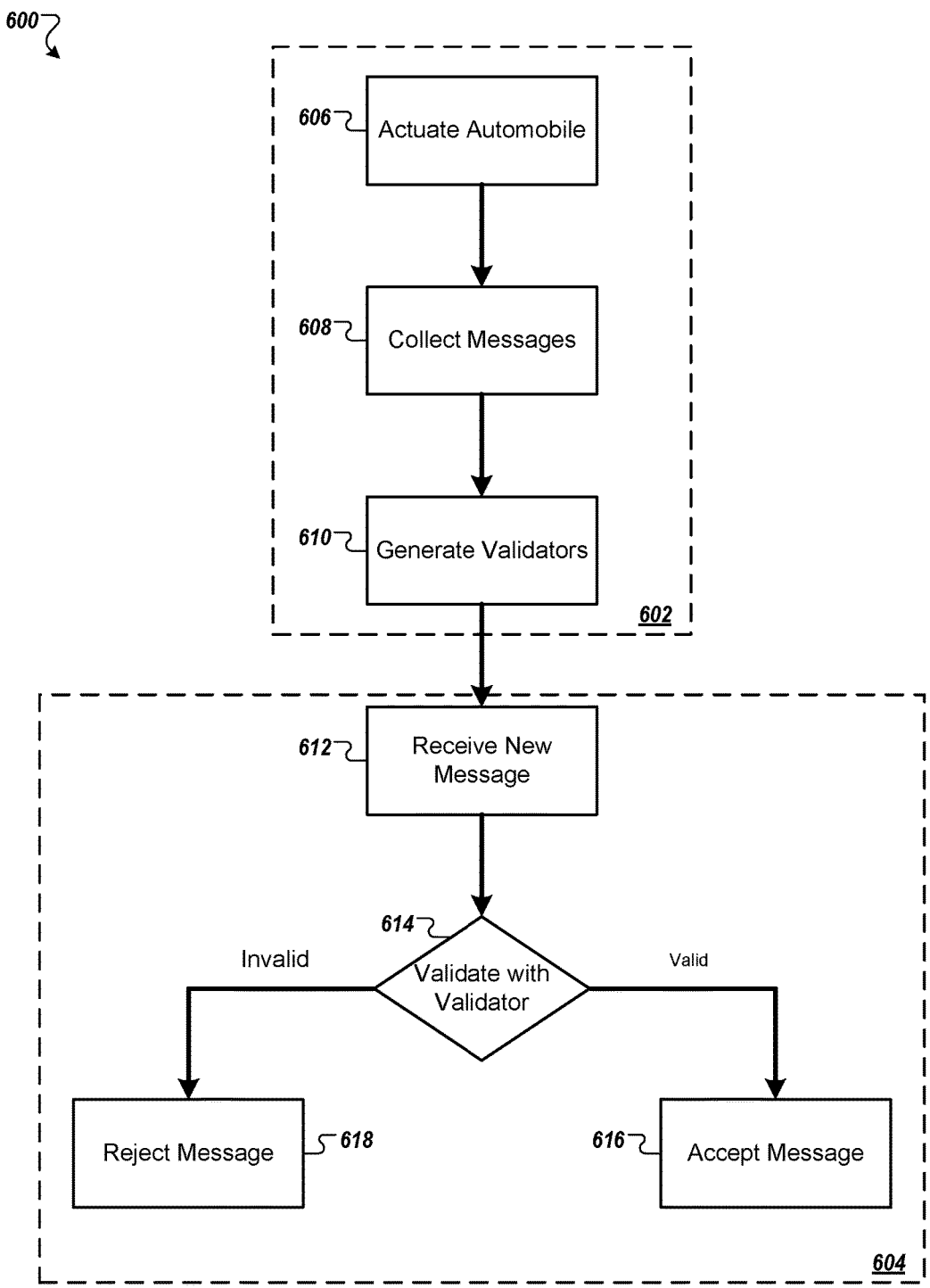
FIG. 6 is a flowchart of an example process used to validate messages.

FIG. 6 is a flowchart of an example process 600 used to validate/authenticate messages. In general, the process 600 can be organized into a training time 602 and an operating time 604. The training time 602 can include actions that are generally used to create validation classifiers (or models), while the operating time 604 can include actions that are generally taken to validate cleartext messages.

Actions taken in the training time 602 can be conducted by a handful of security researchers working with a new automobile in a clean environment cut off from any potential malicious actors or malicious data messages. The actions in the training time 602 may be performed to learn about a particular automobile's messaging scheme in order to understand how validators should be structured, or in order to generate validators (e.g., message models). Additionally or alternatively, actions in the training time 602 can be undertaken by designers of an automobile to be protected. That is, designers of an automobile may, as part of designing the automobile or after completing design of the automobile, use their knowledge of the automobile design in order to generate or design validators.

Actions taken in the operating time 604 can be conducted by ECUs within an automobile as part of the normal function of the automobile. That is, after a validator or set of validators (e.g., message models) is loaded into a receiving ECU, the receiving ECU may use the validators as part of receiving a message from other ECUs in an automobile. As will be understood, the training time 602 and operating time 604 may overlap. For example, an automobile may be loaded with a validator (e.g., message model) for use while driving in operating time 604. Later, further training time 602 testing may result in a computationally more efficient validator that is then loaded onto the automobile for further use in the operating time 604.

An automobile is actuated 606. For example, a technician can start the engine of the automobile, open or close a door, or otherwise engage a part of an automobile that will cause an ECU in the automobile to generate a new message. In some cases, a sensor can be spoofed instead of actuating a physical part of the automobile. For example, a contact sensor designed to sense an open or closed trunk can be manually actuated directly, or a sensor can be replaced with a computer-controlled voltage controller that simulates an open or closed sensor.

Messages are collected 608. For example, the CAN bus of the automobile can be monitored to watch for new messages generated by the ECUs of the automobile. These messages may be collected and stored in computer readable memory for later analysis, along with metadata about the message (e.g., a timestamp, parameters reflecting the status of the automobile when the message was collected).

A validator or model is generated 610. For example, a plurality of the messages may be analyzed in order to design one or more validators (models) that can be used to validate and invalidate messaged created during the operating time. Models can be generated for message payload and/or redundant data within particular message types (e.g., message ids) based the observed messaging behavior within the training environment 602.

Some example validators (e.g., models) include identifying predictable data within cleartext of messages. To identify predictable data, a sequence of the same kinds of messages are identified and analyzed. From this analysis, one or more rules are generated that include comparing a new message to a previous message and determining if the predictable data within the new message is actually within the predicted range given the previous message.

One type of validation test includes finding the Hamming distance between the predictable data of a previous message with the predictable data of a current message. Generally speaking, Hamming distance between two strings of equal length includes finding the number of positions at which the corresponding symbols (e.g., bit values) are different. This may be described as finding the minimum number of substitutions required to change from the previous message to the current message. If the Hamming distance is found to be less than a threshold value determined from analysis of the sequence of messages, the new message can be validated (authenticated).

One type of validation test includes finding the Euclidean distance between the predictable data of a previous message with the predictable data of the current message. Generally speaking, Euclidean distance between two strings of equal length includes mapping the previous message and the current message to points in N-dimensional space, where N is the dimensionality of the predictable data, and finding the distance of the shortest line segment between those two points. If the Euclidean distance is found to be less than a threshold value determined from analysis of the sequence of messages, the new message can be validated.

One type of validation test includes use of machine learning to generate one or more classifiers that is able to classify a new message given a previous message. For example, a machine-learning engine can perform one or more machine learning processes on the sequence of messages as training data. This engine can generate computer code that takes, as input, a previous message and a current message. The computer code then classifies the new message as either valid or invalid given the previous message.

In many cases, ECUs in an automobile generate many different kinds of messages. In such cases, the operations 606-610 can be used to generate many different validators (e.g., models), including at least one validator (e.g., model) for each type of message possible.

A new message is received 612. For example, the validator or validators (e.g., modules) generated 610 can be installed in a new car or as an after-market upgrade. As the automobile is used (e.g., driven), the ECUs in the automobile generate messages to other ECUs for control of the automobile. A receiving ECU can receive messages generated by sending ECUs as part of their control operations for the automobile. In another example, the validator or validators generated 610 can be installed in new home automation controllers in a smart home environment, and/or added as an after-market upgrades. Messages can be transmitted among such home automation controllers to provide monitoring information (which can indirectly be used to perform control operations) and/or to control operation of devices that are managed by the controllers, such as lighting, doors, locks, HVAC equipment, appliances, security systems, and/or other components.

The new message is validated (authenticated) with the validator 614. For example, the receiving ECU can supply the new message to the validator along with the previous message of the same type. In cases in which a plurality of validators (e.g., models) are available, the receiving ECU can select the validator from the available validators. This selection may be based on, for example, the type of message that is to be validated (authenticated).

If the message is validated by the validator (e.g., model), the message is accepted 616. For example, the receiving ECU may store the received message as the most recent message and may operate on the received message. For example, if the received message is an engine temperature message, the receiving ECU may update the dashboard display with the new engine temperature.

If the message is not able to be authenticated, the message is rejected 618. For example, the receiving ECU may discard the message, may enter a heightened security mode, increment a counter indicating messages that are unable to authenticated, and/or may communicate its inability to authenticate a message as an indication of malicious activity.

Figure 7:
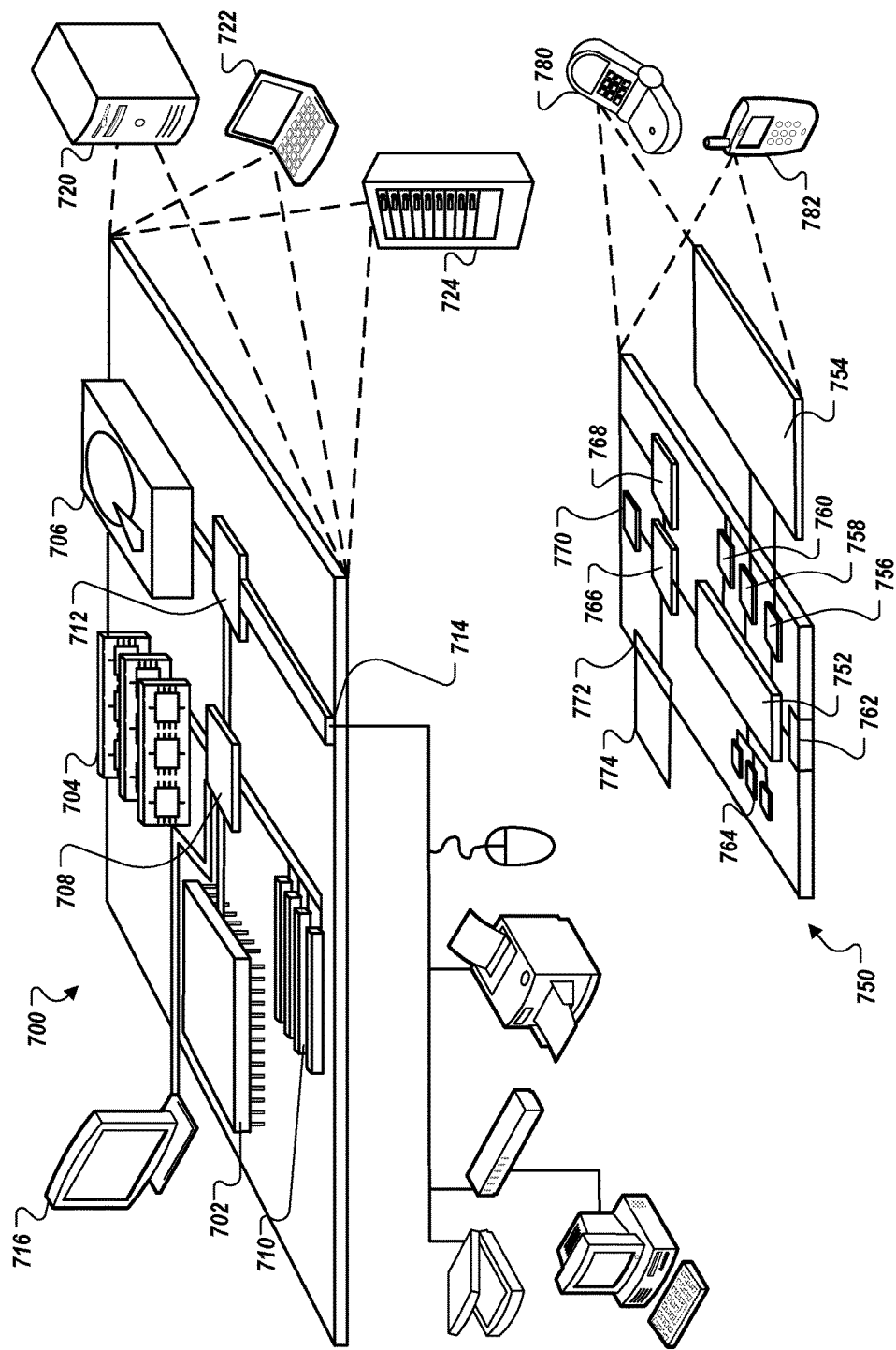
FIG. 7 is a block diagram of example computing devices.

FIG. 7 is a block diagram of example computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 700 is further intended to represent any other typically non-mobile devices, such as televisions or other electronic devices with one or more processors embedded therein or attached thereto. Computing device 750 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed controller 708 connecting to memory 704 and high-speed expansion ports 710, and a low-speed controller 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed controller 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of duties is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed bus 714. The low-speed bus 714 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as computing device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The computing device 750 may also be provided with a storage device, such as a micro-drive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the computing device 750, such as control of user interfaces, applications run by computing device 750, and wireless communication by computing device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of computing device 750 with other devices. External interface 762 may provide, for example, for wired communication (e.g., via a docking procedure) or for wireless communication (e.g., via Bluetooth® or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to computing device 750 through expansion interface 772, which may include, for example, a subscriber identification module (SIM) card interface. Such expansion memory 774 may provide extra storage space for computing device 750, or may also store applications or other information for computing device 750. Specifically, expansion memory 774 may include instructions to carry out or supplement the processes described above, and may include secure information also. Thus, for example, expansion memory 774 may be provide as a security module for computing device 750, and may be programmed with instructions that permit secure use of computing device 750. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768 (e.g., a radio-frequency transceiver). In addition, shortrange communication may occur, such as using a Bluetooth®, WiFi, or other such transceiver (not shown). In addition, GPS receiver module 770 may provide additional wireless data to computing device 750, which may be used as appropriate by applications running on computing device 750.

Computing device 750 may also communicate audibly using audio codec 760, which may receive spoken information from a user and convert it to usable digital information. Audio codec 760 may likewise generate audible sound for a user, such as through a speaker, e.g., in a handset of computing device 750. Such sound may include sound from voice telephone calls, may include recorded sound (e.g., voice messages, music files, etc.) and may also include sound generated by applications operating on computing device 750.

The computing device 750 may be implemented in a number of different forms, as shown in the figure. For example, it may be implemented as a cellular telephone 780. It may also be implemented as part of a smartphone 782, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The technology described in this document can be implemented in a variety of different ways. One possible implementation has been developed as a proof of concept, and a description of this one possible implementation is included in the Appendix. However, it will be understood that other implementations are possible.

What is claimed is:

1. A system to authenticate communication over an in-vehicle communications network using in-place cryptography and authentication to more effectively and efficiently obfuscate network traffic from unintended recipients, the system comprising:

an in-vehicle communications network comprising a first ECU (Electronic Control Unit) and a second ECU;

wherein the first ECU is configured to transmit messages of a particular type over the in-vehicle communications network using in-place cryptography and authentication that replaces cleartext in the messages with the ciphertext that does not include any additional bits of information; and wherein the second ECU is configured to listen for the messages of the particular type transmitted over the in-vehicle communications network and to authenticate the messages as having originated from the first ECU based on the ciphertext, the second ECU being loaded with a predetermined model for the particular type of message that identifies one or more redundancies in the messages, the authentication including transforming the ciphertext into the cleartext and verifying the first ECU as the source of the messages by identifying the one or more redundancies in the cleartext.

2. The system of claim 1, wherein the predetermined model is generated in a secure environment using analysis of the first ECU and the cleartext in the messages of the particular type that are transmitted by the first ECU over the in-vehicle communications network.

3. The system of claim 2, wherein the analysis includes one or more of static analysis, dynamic analysis, and machine learning.

4. The system of claim 1, wherein the predetermined model identifies particular bits in the cleartext for messages of the particular type that provide the one or more redundancies and corresponding predictable values for the particular bits.

5. The system of claim 4, wherein the predetermined model further identifies the particular bits based on previous messages in a sequence of messages of the particular type that have been received from the first ECU.

6. The system of claim 4, wherein the predetermined model further identifies the particular bits based on a presence of one or more patterns of values of bits in the cleartext.

7. The system of claim 1, wherein the second ECU generates the cleartext from the ciphertext, in part, by performing a logical operation on the ciphertext using a value derived from a counter for the messages of the particular type from the first ECU, the counter value being incremented for each message of the particular type that is transmitted over the in-vehicle communications network.

8. The system of claim 1, wherein the second ECU is configured to regenerate the cleartext from the ciphertext using one or more modifications in response to the one or more redundancies not being identified within the cleartext.

9. The system of claim 8, wherein the second ECU generates the cleartext from the ciphertext, in part, by performing a logical operation on the ciphertext using a value derived from a counter for the messages of the particular type from the first ECU, and wherein the cleartext is regenerated by modifying the value of the counter.

10. The system of claim 9, wherein the logical operation includes an XOR operation.

11. The system of claim 9, wherein the value is derived from the counter by taking a hash of the counter or applying one or more pseudo-random functions (PRF) to the counter.

12. The system of claim 9, wherein the counter is incremented for each instance of the cleartext being regenerated, and wherein the cleartext is regenerated a first threshold number of times, and after unsuccessfully attempting authenticate the message a second threshold number of times, the second ECU discards the message.

13. The system of claim 12, wherein the second ECU additionally generates an alarm in response to unsuccessfully attempting to authenticate the message the second threshold number of times.

14. The system of claim 12, wherein the second ECU generates the alarm in response to at least a threshold number of messages from the first ECU over a period of time being unsuccessfully authenticated.

15. The system of claim 1, wherein the in-place cryptography performed by the first ECU on the cleartext to generate the ciphertext comprises:

accessing a counter for the particular type of messages transmitted to the second ECU, generating a reproducible value from the counter, performing a logical operation on the reproducible value and the cleartext to generate a combined value, and applying one or more block ciphers to the combined value to generate the ciphertext; and wherein the second ECU generates the cleartext from the ciphertext by performing operations comprising:

applying the one or more block ciphers to the ciphertext to generate the combined value, accessing a local copy of the counter maintained on the second ECU for the particular type of messages transmitted with the first ECU, generating a local reproducible value from the local copy of the counter, and performing the logical operation on the local reproducible value and the combined value to generate the cleartext.

16. The system of claim 15, wherein only the ciphertext is transmitted from the first ECU to the second ECU, which is preprogrammed to use the one or more block ciphers, to maintain the local copy of the counter, to perform one or more operations to generate the local reproducible value, and to perform the logical operation.

17. The system of claim 1, wherein the in-vehicle communications network comprises a CAN bus.

18. The system of claim 17, wherein the first ECU, the second ECU, and the CAN bus are part of an automobile.

19. A method for to authenticate communication over an in-vehicle communications network using in-place cryptography and authentication to more effectively and efficiently obfuscate network traffic from unintended recipients, the method comprising:

transmitting, by a first ECU, messages of a particular type over the in-vehicle communications network using in-place cryptography and authentication that replaces cleartext in the messages with the ciphertext that does not include any additional bits of information; and listening, by a second ECU, for the messages of the particular type transmitted over the in-vehicle communications network and to authenticate the messages as having originated from the first ECU based on the ciphertext, the second ECU being loaded with a predetermined model for the particular type of message that identifies one or more redundancies in the messages, the authentication including transforming the ciphertext into the cleartext and verifying the first ECU as the source of the messages by identifying the one or more redundancies in the cleartext.

20. A non-transitory computer-readable medium comprising instructions that, when executed by one or more processors, cause the processor to perform operations to more effectively and efficiently obfuscate network traffic from unintended recipients, the operations comprising:

transmitting, by a first ECU, messages of a particular type over an in-vehicle communications network using in-place cryptography and authentication that replaces cleartext in the messages with the ciphertext that does not include any additional bits of information; and listening, by a second ECU, for the messages of the particular type transmitted over the in-vehicle communications network and to authenticate the messages as having originated from the first ECU based on the ciphertext, the second ECU being loaded with a predetermined model for the particular type of message that identifies one or more redundancies in the messages, the authentication including transforming the ciphertext into the cleartext and verifying the first ECU as the source of the messages by identifying the one or more redundancies in the cleartext.

* * * * *